United States Patent
Boylan et al.

(10) Patent No.: US 6,618,274 B2
(45) Date of Patent: Sep. 9, 2003

(54) SYNCHRONOUS RECTIFIER CONTROLLER TO ELIMINATE REVERSE CURRENT FLOW IN A DC/DC CONVERTER OUTPUT

(75) Inventors: Jeffrey John Boylan, Richardson, TX (US); Qing Chen, Plano, TX (US); Jin He, Plano, TX (US); Del Ray Hilburn, Mesquite, TX (US)

(73) Assignee: Innoveta Technologies, Plano, TX (US)

( * ) Notice: Subject to any disclaimer, the term of this patent is extended or adjusted under 35 U.S.C. 154(b) by 0 days.

(21) Appl. No.: 09/973,218

(22) Filed: Oct. 9, 2001

(65) Prior Publication Data

US 2003/0067794 A1 Apr. 10, 2003

(51) Int. Cl.$^7$ .............................................. H02M 3/335
(52) U.S. Cl. .................. 363/17; 363/21.06; 363/21.14; 363/26; 363/65; 363/89
(58) Field of Search ............................. 363/15, 16, 17, 363/20, 21.01, 21.06, 21.14, 24, 25, 26, 65, 89, 127

(56) References Cited

U.S. PATENT DOCUMENTS

| | | | |
|---|---|---|---|
| 5,303,138 A | | 4/1994 | Rozman |
| 5,481,436 A | | 1/1996 | Werther |
| 5,636,116 A | * | 6/1997 | Milavec et al. ............... 363/89 |
| 5,870,290 A | | 2/1999 | Chun et al. |
| 5,920,475 A | | 7/1999 | Boylan et al. |
| 5,940,287 A | | 8/1999 | Brkovic |
| 6,038,154 A | | 3/2000 | Boylan et al. |
| 6,101,104 A | | 8/2000 | Eng |
| 6,169,675 B1 | * | 1/2001 | Shimamori et al. ......... 363/127 |
| 6,191,964 B1 | | 2/2001 | Boylan et al. |
| 6,201,304 B1 | | 3/2001 | Moden |

* cited by examiner

Primary Examiner—Jeffrey Sterrett
(74) Attorney, Agent, or Firm—David W. Carstens; Carstens Yee & Cahoon LLP

(57) ABSTRACT

A control scheme for a synchronous rectifier converter that avoids disabling the synchronous rectifiers entirely. Rather than disable the synchronous rectifier altogether to stop the flow of reverse current in light-load, startup, or shutdown conditions, the duty cycle of the synchronous rectifier is modified such that forward current is always allowed to flow through the synchronous rectifier, but the synchronous rectifier is turned off before the reverse current flow reaches a pre-determined level. This is accomplished by operating the converter in a partially synchronous mode of operation during light-load, startup, or shutdown conditions. Whether the circuit is in a light-load, startup, or shutdown condition is determined by a circuit characteristic of the converter that is sensed by the controller, such as average output current. The desired changeover point from fully-synchronous mode to the partially synchronous mode is set to a predetermined level of output current for the converter. The predetermined level is set based on the particular power system in which the invention is implemented. For example, this level can be based on the amount of reverse current that would disrupt the bus to which the converter output is connected, or it could be based on the heat created by the reverse current flow in the power converter when heat dissipation is a concern. The control scheme of the present invention effectively limits reverse current flow while also improving efficiency by eliminating the need for discrete diodes, yet retaining the benefits of synchronous rectification throughout the operating range of the converter.

20 Claims, 10 Drawing Sheets

TWO CONVERTERS IN PARALLEL

SYNCHRONOUS RECTIFIER CONTROLLER TO ELIMINATE REVERSE CURRENT FLOW IN A DC/DC CONVERTER OUTPUT

BACKGROUND OF THE INVENTION

1. Technical Field

The present invention is directed to a power system and more particularly to a method and apparatus for controlling a synchronous rectifier power converter.

2. Description of Related Art

In order to meet the ever-increasing demand for high speed and miniaturization of digital devices, microelectronic circuit voltage levels have been dropping. No longer are 5 V and 12 V power supplies dominant, but rather 3.3 V, 2.5 V, 1.8 V, and 1.5 V and others are becoming increasingly common as the standard voltages in many electronic devices. Traditional 5V and 12V power supplies typically use diodes to rectify secondary AC voltage to a DC voltage. These supplies allow the output current on the secondary side to "freewheel" during the time that the power switches on the primary side are off. However, as output voltage decreases, the power loss incurred in the rectifier diodes becomes very large compared to the output power. For example, using 0.5 V Schottky diodes in a 1V output power supply results in a power loss of approximately 33% of the output power in the rectifier circuits alone.

Further, high-power density is crucial in applications where the space for the power supply relative to the power output is limited. Thus, there is an ongoing quest to develop power supplies with increased density. Limiting a power supply to a small area requires that the power supply be efficient because the heat transfer capability decreases as the overall size of the power supply decreases. To achieve higher efficiency, synchronous rectifiers are increasingly used in low output voltage DC to DC converters. One with skill in the art understands that the use of a synchronous rectifier field effect transistor ("FET") greatly improves the DC to DC conversion efficiency. The advantage of the synchronous rectifier FET is the very low "on resistance" of current FETs which can be even further reduced by paralleling multiple devices.

Although synchronous rectifiers are much more efficient than diode rectifiers at today's lower voltage levels, they are not without their drawbacks. One of the major problems is caused by the bi-directional nature of current flow in a synchronous rectifier. During startup, light-load, or shut-down conditions, for example, a significant reverse power flow may occur when several power modules using synchronous rectifiers are connected in parallel for highly reliable microelectronic systems or when a pre-bias voltage is applied to the output of the power supply. This phenomenon, which is well known in the art, can bring down the output bus voltage, thus causing malfunction or shut-down to downstream voltage-sensitive electronic devices.

For DC to DC converters using synchronous rectifiers that are connected in a parallel configuration, the bi-directional power flow characteristics can result in a very undesirable operating condition in which one converter drives the output of the other converter. When one or more converters are operating in this reverse power processing mode, the overall power system can be circulating a significant amount of current while actually delivering very little current to the converter output load. This results in an undesirably high power dissipation within the converters even under light-load or no load conditions.

Because of this effect, turn-on and startup transients have become major concerns in systems where two or more DC to DC converters employing synchronous rectifier FETs are connected in parallel without any or-ing diodes. If proper control of the synchronous rectifiers is not used in such a system, one of the converters may behave as a load, sinking current from the other converter, even under a no load condition. Such a system is inefficient and may result in abnormal startup of the system. The system transient response could also be detrimentally affected during the converter's transition from the reverse power processing mode to a forward processing mode.

In response to this problem, several solutions have been proposed. Eng (U.S. Pat. No. 6,101,104) proposes a control method and apparatus that senses the voltage across the synchronous rectifier, and turns the synchronous rectifier off when the voltage across the rectifier is about to change polarity. Ideally the synchronous rectifier is turned off at the approximate instant that the voltage across the rectifier reaches approximately zero. Thus, current flow in the reverse direction is avoided in the synchronous rectifier FET. Brkovic (U.S. Pat. No. 5,940,287) proposes a transient response network including a synchronous rectifier controller that senses the state of the power switch and then disables the synchronous rectifier device when the power switch has remained in a non-conducting state for a specified period of time. Boylan and Rozman (U.S. Pat. Nos. 6,038,154 and 6,191,964 B1) have proposed a control circuit for operating a synchronous rectifier in both a bi-directional mode and a uni-directional mode of operation as a function of characteristics of the power system employing the synchronous rectifiers. Based on the characteristic sensed, the control circuitry switches between the bi-directional and uni-directional mode of operation by enabling or disabling the synchronous rectifier FET. In the bi-directional mode, the control circuitry switches the synchronous rectifier FETs to rectify the substantially alternating current as well as the free-wheeling current. Bi-directional current flow is possible in this mode of operation. In the uni-directional mode, the synchronous rectifier FETs are disabled to act as a conventional diode rectifier (due to the intrinsic body diode of the FET), allowing only uni-directional current and thereby preventing reverse power flow because the diode only conducts in one direction.

Referring now to FIG. 1, a schematic diagram of a prior art clamped-mode forward converter circuit 100 with a synchronous rectifier circuit 130 is illustrated. This circuit is described in more detail in U.S. Pat. No. 6,191,964 B1 to Boylan et al., issued Feb. 20, 2001, entitled "Circuit and Method for Controlling a Synchronous Rectifier Converter," and incorporated herein by reference as if fully set forth at length. The clamped-mode forward converter circuit 100 and its advantages are discussed in U.S. Pat. No. 5,303,138 to Rozman, issued on Apr. 12, 1994, entitled "Low Loss Synchronous Rectifier for Application to Clamped-Mode Power Converters," and incorporated herein by reference as if fully set forth at length.

The clamped-mode forward converter circuit 100 comprises a voltage input $V_{IN}$ connected to a primary winding 110 of a power transformer by a power switch (e.g., MOSFET) Q1. The power switch Q1 is shunted by series connection of a clamp capacitor Cclamp and a power switch Q2. The conducting intervals of the power switch Q1 and the power switch Q2 are mutually exclusive. The duty cycle of the power switch Q1 is D and the duty cycle of the power switch Q2 is 1-D.

A secondary winding 135 of the power transformer is connected to an output filter capacitor $C_{out}$ through an output filter inductor Lout and the synchronous rectifier circuit 130, providing a substantially alternating current input to the synchronous rectifier 130. The synchronous rectifier circuit 130 comprises control circuitry 150 and switching circuitry. A rectifying synchronous rectifier device SR1 and a freewheeling synchronous rectifier device SR2 comprise the switching circuitry. The switching circuitry may be realized with any suitable rectifier devices, although a low $R_{DS(on)}$ n-channel MOSFET is suitable for such applications. A diode D1 and a diode D2 are discrete devices placed in parallel with the synchronous rectifier devices SR1, SR2, respectively. However, the diodes D1, D2 may represent an intrinsic body diode of a n-channel MOSFET.

A current sensing device 165 encompasses either a current shunt connected in series with the output, or a Hall effect current sense device in series with the output. The sensed current signal is then provided to a parallel control circuitry 170 to facilitate forced load sharing.

The current signal is also provided to a level detector 175 which compares the load current to some predetermined reference level. When the converter is operating below some fraction of full rated load current, perhaps 5% or 10%, the detector 175 will disable the synchronous rectifier drive circuit 130. This action reconfigures the converter from a synchronous rectifier circuit to a conventional diode rectifier circuit. Because a diode rectifier circuit cannot process power in the reverse direction, the proposed circuit effectively prevents reverse power flow. When the converter output current increases beyond the 5% or 10% trip level (some hysteresis is probably preferred to prevent mode switching oscillation), the synchronous rectifier drive circuit 130 is enabled, resuming normal operation. Thus, the control circuit 150 transitions the switching circuitry SR1, SR2 from the bi-directional mode to the uni-directional mode when the output current level drops below a predetermined threshold level.

The remaining circuitry in FIG. 1 is standard for synchronous rectifier circuits configured for parallel operation. A voltage regulator 180 monitors the load and maintains the output voltage $V_{out}$ within tolerance limits despite changes in both the load and the input voltage $V_{in}$. A pulse-width modulation ("PWM") circuit 185 is included to keep the output voltage $V_{out}$ of the converter constant over the various operating conditions. Finally, the circuits are coupled as illustrated by the interconnecting lines and arrows, and the synchronous rectifier control circuitry 150 and the PWM circuit 185 are coupled to the clamped-mode circuit 100.

Note that the circuit in FIG. 1 retains the efficiency benefits of synchronous rectification at higher loads, but does not retain the benefit of synchronous rectifiers in light-load or startup conditions. Reconfiguring the circuit to diode rectification at light-loads prevents reverse power flow, but results in higher power losses if the integral body diodes of SR1 and SR2 are used as diodes D1 and D2, respectively. Although discrete devices can be used as diodes D1 and D2 to prevent the current and thermal stress, as stated before, the use of discrete diodes decreases the power density of the power supply, thus requiring more area for the circuit and increasing the cost of the circuit.

Referring now to FIG. 2, a schematic diagram of a prior art non-isolated buck converter ("buck converter") 200 with a synchronous rectifier circuit 210 is illustrated. The buck converter 200 includes a power switch Q1, output filter capacitor $C_o$, filter inductor $L_o$, resistive load $R_o$, voltage regulator 250, and a pulse-width modulator ("PWM") circuit 270. The synchronous rectifier circuit 210 includes control circuitry 220 and switching circuitry. A switch (e.g., MOSFET) Q2 comprises the switching circuitry. The switching circuitry may be realized with any suitable rectifier devices including a low $R_{DS(on)}$ n-channel MOSFET with an integral body diode of the n-channel MOSFET. The switch Q2 is capable of carrying bi-directional current and the buck converter 200 is susceptible to bi-directional power flow. To prevent the bi-directional power flow, the switch Q2 may be disabled through the control circuitry 220 coupled to a sensing device 230. Analogous to the rectifier circuit of FIG. 1, the rectifier transitions from the bi-directional mode to the uni-directional mode of operation by disabling switch Q2 (analogous to disabling synchronous rectifier device SR1 in FIG. 1). The bi-directional power flow is prevented in the buck converter 200 by replacing the switch Q2 with a diode or by disabling the switch Q2 and relying on its integral body diode.

One of the problems with the prior art solutions is that disabling the synchronous rectifier forces the output inductor current to continue to flow through the synchronous rectifier FET body diode. This creates extra power dissipation in the synchronous rectifier FET devices and causes undesired power and thermal stress. Modem low-voltage synchronous rectifier FETs have a relatively lossy body diode. As a result, the use of the above-proposed solutions may require additional low voltage drop Schottky rectifier diodes to be added in addition to the lossy body diode. This is an undesirable solution in most cases because the power supply density is decreased and the cost of the power supply is increased.

Therefore a power supply is needed in which a new or improved control method or circuit for operating the power converter is used. The control circuit should allow multiple DC to DC converter systems using synchronous rectifiers connected in a parallel configuration to operate in an efficient manner regardless of the state of the system. The control system should avoid undesired reverse current and thermal stresses on the synchronous rectifier FETs that are caused when these devices are disabled. The system should continue to prevent substantial reverse current power flow either during light-load or no load operating conditions or during startup or shutdown conditions.

SUMMARY OF THE INVENTION

The present invention is a control scheme for a synchronous rectifier converter that prevents substantial reverse current flow in all modes of operation without disabling the synchronous rectifiers. Rather than disable the synchronous rectifier altogether to stop the flow of reverse current in light-load, startup, or shutdown conditions, the secondary synchronous rectifier is always enabled, operating either in the fully-synchronous mode or the partially-synchronous mode. The transition between the two operating modes is determined by sensing a system parameter. For example, this parameter can be based on the amount of reverse current that would disrupt the bus to which the converter output is connected, or it could be based on the heat created by the reverse current flow in the power converter when heat dissipation is a concern. In the partially-synchronous mode, a duty cycle of the synchronous rectifier switch is modified to turn off the synchronous rectifier before the output current goes negative. The control scheme of the present invention effectively limits substantial reverse current flow while also improving efficiency by eliminating the need for discrete diodes, yet retaining the benefit of synchronous rectification throughout the operating range of the converter.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

The present invention is a novel control scheme for a DC to DC converter employing synchronous rectifiers such as the ones described above. Essentially, different control laws are used for different modes of operation. The control laws presented herein for synchronous rectification under the different modes of operation provide an effective way to eliminate undesirable reverse current flow while still maintaining the high circuit efficiency that is provided by synchronous rectification. In the embodiments described below, the DC to DC converters are operated in two modes, defined herein as the fully-synchronous mode and the partially-synchronous mode. The converter is in a fully-synchronous mode under normal operating conditions, whereas during startup, light-load, or shutdown conditions, the converter is operated in the partially-synchronous mode. A circuit parameter is sensed to determine whether the converter is in a normal operating condition or a startup/light-load condition. The invention is first described with reference to FIGS. 3A to 8 in a double-ended topology, i.e., a full bridge, half bridge and push-pull DC to DC converter. The control scheme is then extended to a single-ended topology, i.e. a forward converter, with reference to FIGS. 9 to 11, and finally, the control scheme is extended to a non-isolated topology, i.e. a buck converter, with reference to FIGS. 12 to 14.

Figure 1:
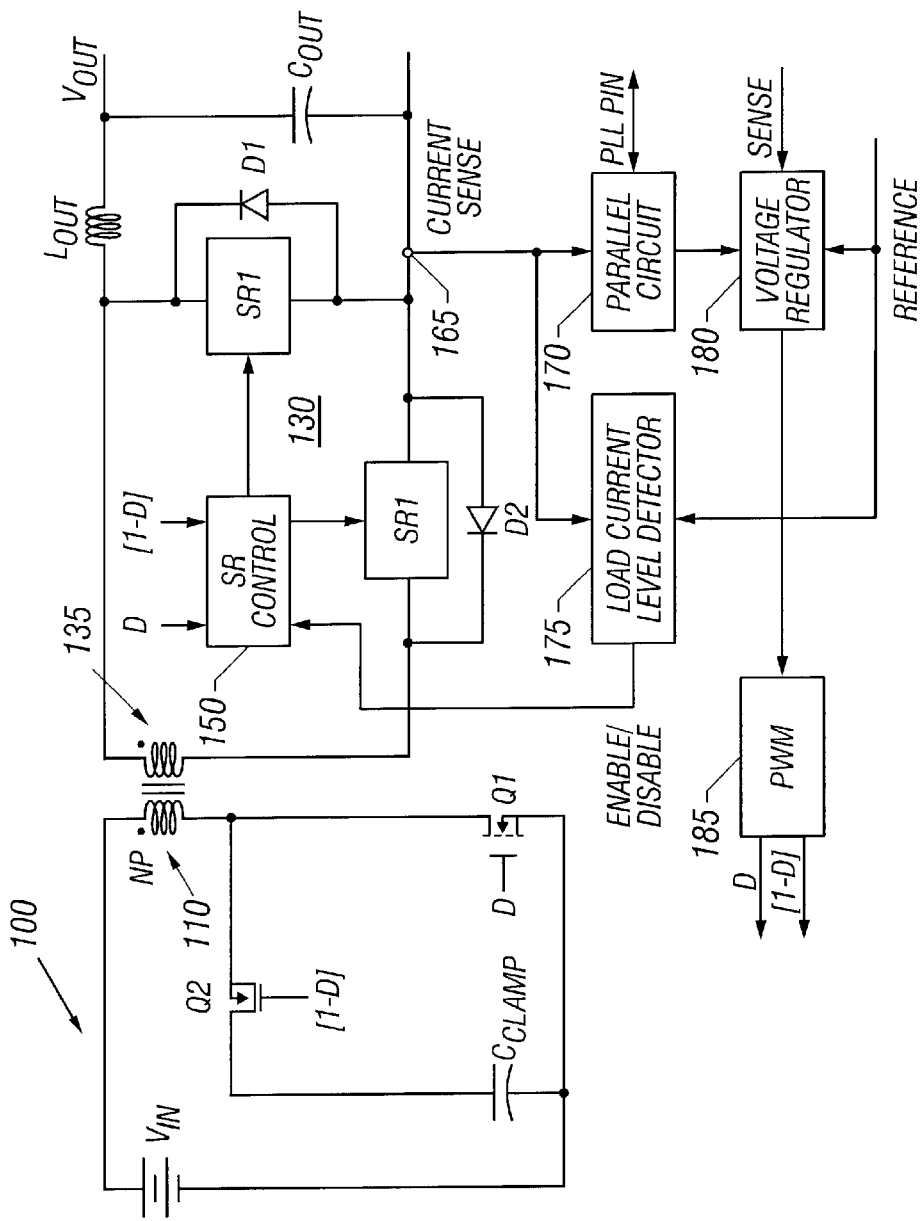
FIG. 1 is a schematic diagram of a prior art clamped-mode forward converter circuit with a synchronous rectifier circuit.
Figure 2:
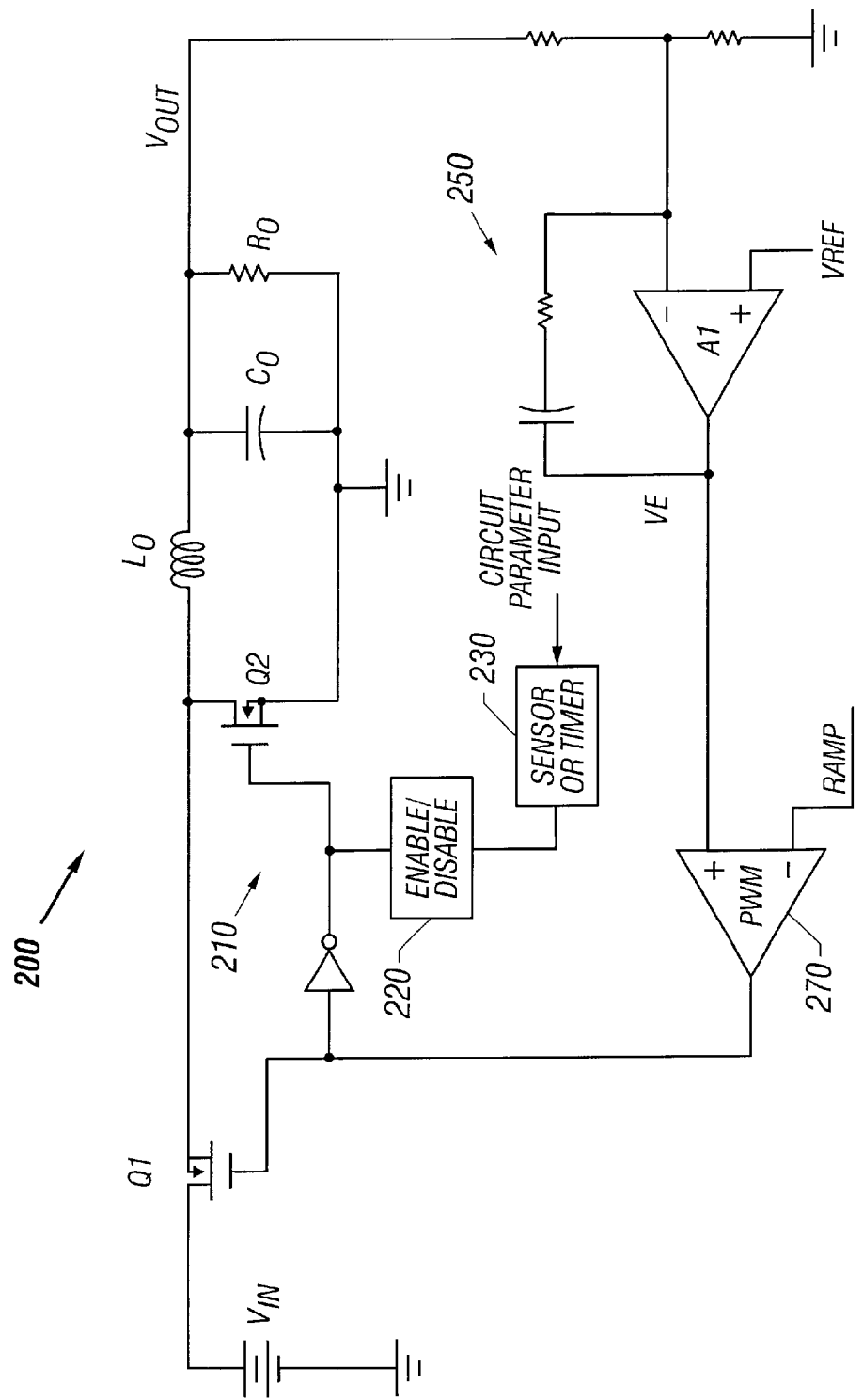
FIG. 2 is a schematic diagram of a prior art non-isolated buck converter with a synchronous rectifier circuit.
Figure 3A:
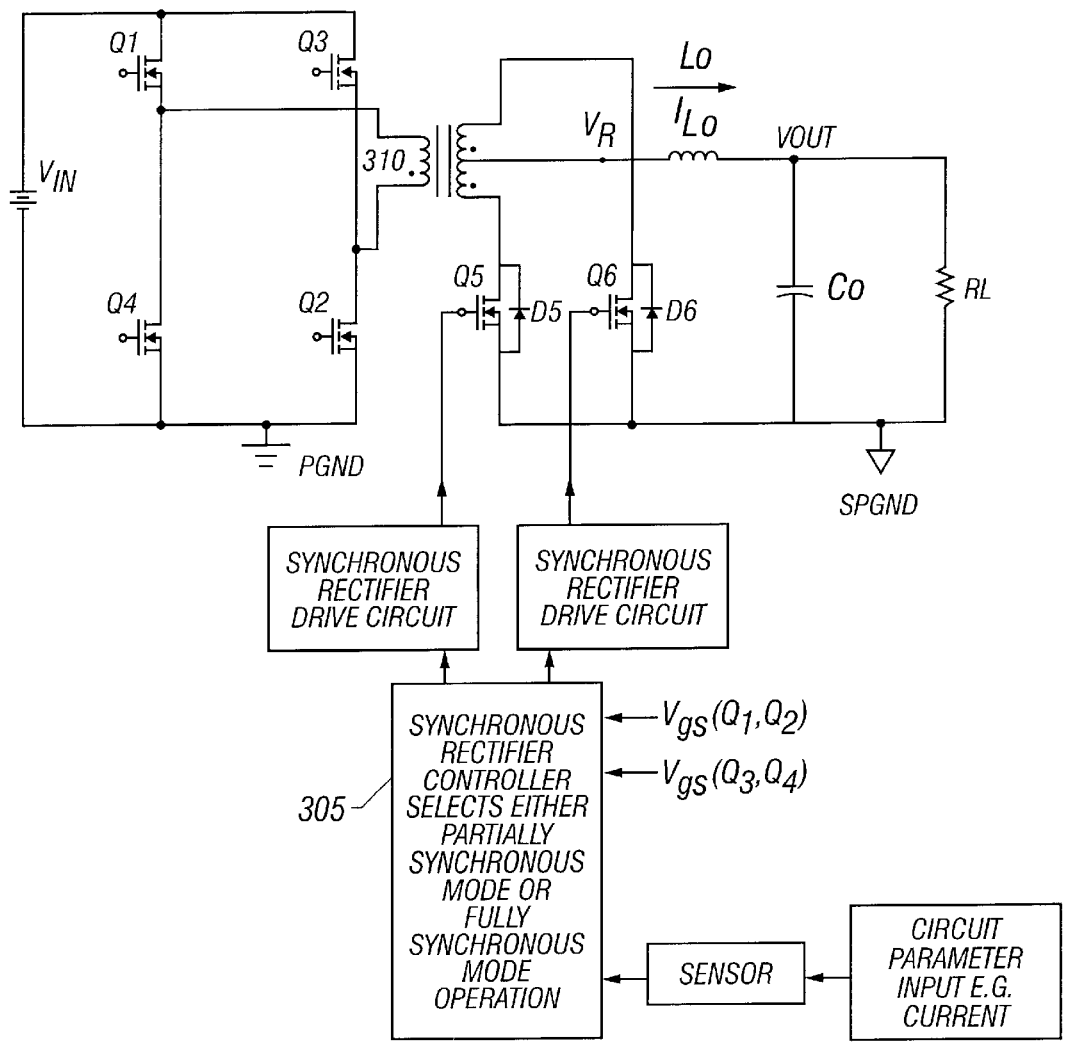
FIG. 3A is a schematic diagram of a full bridge DC to DC converter embodiment of the present invention.

Referring now to FIG. 3A, a full bridge DC to DC converter in which the present invention may be implemented is illustrated. The two pairs of primary power switches Q1, Q2, and Q3, Q4 provide alternating current to the primary winding of the transformer 310, and the two secondary synchronous rectifier switches Q5, Q6, consisting of active switches such as MOSFETs, bipolar junction transistors (BJTs), or other types of controllable devices, rectify the transformed alternating current back to DC. The diodes D5 and D6 connected across the synchronous rectifier switches Q5 and Q6 can be either the body diodes of switches Q5 and Q6 or external diodes.

The control law selector circuitry 305 is responsible for determining when the converter is in a no-load, light-load, startup, or shutdown mode of operation. Said differently, the control circuitry should distinguish between conditions that indicate a normal positive power flow (current sourcing) and conditions that indicate potentially substantial negative power flow (current sinking). Thus, some negative power flow or reverse current may be allowed depending on the application, although at the time of switching modes, it is desirable for the instantaneous current flow to be greater than or equal to zero. The predetermined threshold level for allowable reverse current flow will vary depending on the particular implementation and the design requirements. For example, if an output bus is driven high through a low power unit, any current sufficient to pull the unit into current limit would disrupt the bus, a condition that should be avoided. Thus, the current level required to disrupt the bus is the starting point for designing the threshold level. For a typical system, one or two amps of reverse current may be allowable.

The direction and magnitude of power flow at any given time can be determined using any of a number of characteristics of the circuit commonly known in the art to be directly related to the direction of power flow. These characteristics include, but are not limited to, the average output current, the difference between the average secondary side rectified voltage and the output voltage, and the polarity of the voltage across a synchronous rectifier switch.

The synchronous rectifier drive circuitry 305 may be either a control driven circuit, or a self-synchronized drive circuit. Additionally, the overall power train topology encompasses any topology suitable for synchronous rectification including, without limitation, transformer isolated topologies, and is not limited to the topology shown in the illustrated embodiment.

When considering reverse power flow in a synchronous rectifier, it is important to understand the distinction between instantaneous and average reverse power flow. Instantaneous reverse power (or output filter inductor current) flow may be defined as negative power (or current) flow for only a portion of each switching cycle. The current does not remain negative for an entire switching cycle. Average reverse power (or output filter inductor current) flow may be defined as a net negative current averaged over more than one switching cycle. During a startup or shutdown transient, for example, average negative current could be maintained for several switching cycles prior to the current settling out in steady state, but need not remain negative continuously.

Figure 4A:
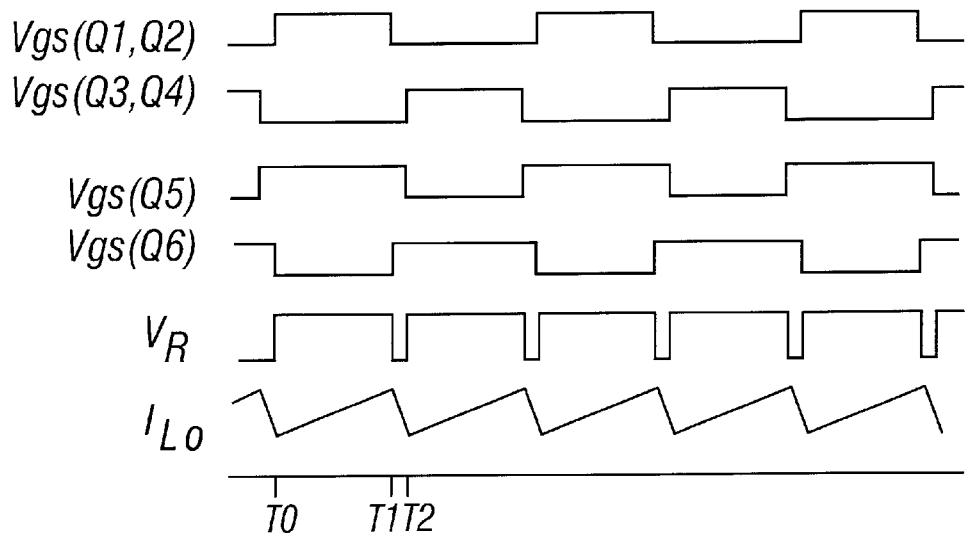
FIG. 4A is a timing diagram for the converter of FIG. 3A in the fully-synchronous mode of operation.

Referring now to FIG. 4A, the timing diagram for the converter of FIG. 3A in a normal operating condition is shown. Under normal operating conditions, typically under heavy load, the output inductor current $I_{Lo}$ is in the continuous conduction mode (CCM). Under such conditions, the converter is operated in a fully-synchronous mode. The two primary switches Q1 and Q2 turn on and off at the same time while the two primary switches Q3 and Q4 also turn on and off at the same time. However, the pair of switches Q1, Q2, is always out of phase with the other pair of switches Q3, Q4. Thus, the primary switches operate according to the following equations:

$$Vgs(Q1)=Vgs(Q2)=Vgs(Q1,Q2) \text{ and } Vgs(Q3)=Vgs(Q4)=Vgs(Q3,Q4) \qquad (1)$$

Each secondary synchronous rectifier switch Q5, Q6 is controlled to follow a pair of power switches on the primary. In the circuit shown in FIG. 3A the synchronous rectifier switches operate according to the following equations in the fully-synchronous mode:

$$Vgs(Q5)=\overline{Vgs(Q3,Q4)} \text{ and } Vgs(Q6)=\overline{Vgs(Q1,Q2)} \qquad (2).$$

In the fully-synchronous mode of operation, at least one of the secondary synchronous rectifier switches Q5, Q6 is on when the primary switches are on, and both synchronous rectifier switches Q5, Q6 are on when the primary switches are off. In the fully-synchronous mode, the DC to DC converter retains all the advantage of synchronous rectification, such as low conduction loss and fast dynamic response.

Figure 15:
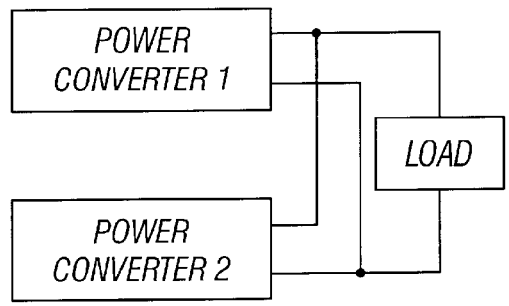
FIG. 15 depicts two converters in parallel.

Although the control law of Eq. (2) above works well under normal operating conditions, this primary-secondary complimentary control scheme can cause problems during startup when an external voltage is applied to the output of the converter either through paralleling with another converter module (refer to FIG. 15) or pre-bias feedback by downstream electronic devices. Typically, during startup, a soft-start circuit is used to gradually increase the duty cycle for the primary switches Q1–Q4 from zero to a steady state value. If the steady state control law as given in Eq. (2) is followed during startup, the synchronous switches will start from full (100%) duty cycle and gradually reduce to a steady state value. Thus, the node connecting the output inductor to the center tap of the transformer is practically shorted to the secondary power ground (SPGND in FIG. 3A). Because the inductor current is not fully established during startup, the output is also considered to be grounded. Two problems can result from shorting the output through the inductor, transformer, and synchronous rectifier switches to ground. First, the output bus will be brought down, which can cause malfunction or damage to downstream electronic devices. Second, the discharging current from the capacitor bank is very high because of the low impedance path from the output through the inductor, transformer, and synchronous rectifier switches to ground. This can damage the synchronous rectifier switches especially when a large capacitor bank is employed.

Figure 4B:
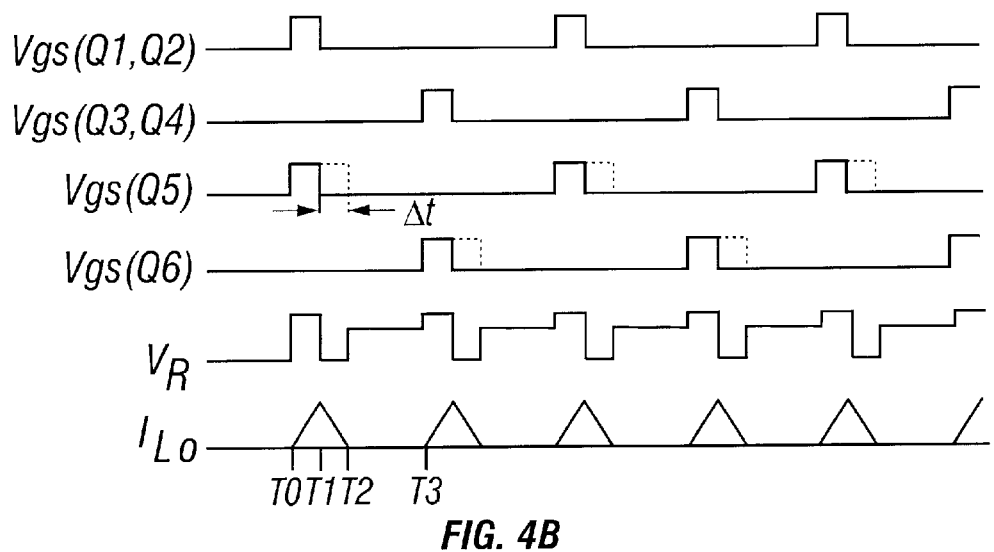
FIG. 4B is a timing diagram of the circuit of FIG. 3A in a partially-synchronous mode of operation.

Referring now to FIG. 4B, a timing diagram of the circuit of FIG. 3A is shown for a partially-synchronous mode of operation. To solve the problems discussed above, the present invention proposes a control method that will operate the synchronous rectifiers in a partially-synchronous mode of operation during light-load, startup, or shutdown conditions. This is accomplished by changing the on/off control signal for the synchronous rectifier switches in the fully-synchronous mode such that the synchronous rectifier switches are turned off before the output inductor current reaches zero. In one embodiment of the present invention, the control signals for Q5 and Q6 are governed by the following equation in the partially-synchronous mode:

$$Vgs(Q5)=Vgs(Q1,Q2)+\Delta t \text{ and } Vgs(Q6)=Vgs(Q3,Q4)+\Delta t \qquad (3)$$

$$\text{where } 0 \leq \Delta t \leq T2-T1 \qquad (4)$$

where T2=time when the inductor current reaches zero and

T1=time when the primary side power switches are turned off.

The above equations show that during startup, or when the primary switches are operating with a very small duty cycle as illustrated in FIG. 4B, the synchronous rectifier switches no longer operate in a complimentary manner with respect to the primary power switches. Rather, the control signals for the synchronous rectifier switches follow the control signals for their respective primary switches with a small time extension $\Delta t$. Thus, because the synchronous rectifier switches are turned off before the inductor current reaches zero at T2, the inductor current does not flow in the reverse direction. Consequently, the output bus voltage will not be discharged through the synchronous rectifier switches.

The simplest control circuit is derived by setting $\Delta t=0$, and letting the synchronous rectifier switches follow the primary drive signals. In this way, forward charging current $I_{Lo}$ (during the interval T0 to T1), i.e. the forward current through the inductor Lo in FIG. 3A during the time that one of the primary power switches is on, flows through the synchronous rectifier switches Q5 and Q6, and only freewheeling current $I_{Lo}$ (during the interval T1 to T2), i.e. current flowing through Lo after the power from the primary side is cut off, flows through the synchronous rectifier switch body diode (or the external diodes if they are used). If it is desirable for the synchronous rectifier switches to conduct the freewheeling current $I_{Lo}$ (during the interval T1 to T2), a duty cycle extension circuit may be used as described below. However, the synchronous rectifier switch should be turned off before the inductor current reaches zero at T2. The partially-synchronous mode of operation defined by Eqs. (3) and (4) allow the synchronous rectifier switches to conduct when the primary switches are on and conduct partially during the time that the primary switches are off, thus the nomenclature "partially-synchronous mode."

The trigger used to determine when to switch between the partially-synchronous mode and the fully-synchronous mode can be derived from sensing current, voltage, duty cycle, or other parameters characterizing either startup or light-load operation as is commonly known in the art. An embodiment given here is to sense the average load current. When the load current is below a preset value, the synchronous rectifiers are operated in the partially-synchronous mode (Eq. (3)), whereas when the load current rises above a preset value, the synchronous rectifiers are operated in the fully-synchronous mode (Eq. (2)).

Figure 5:
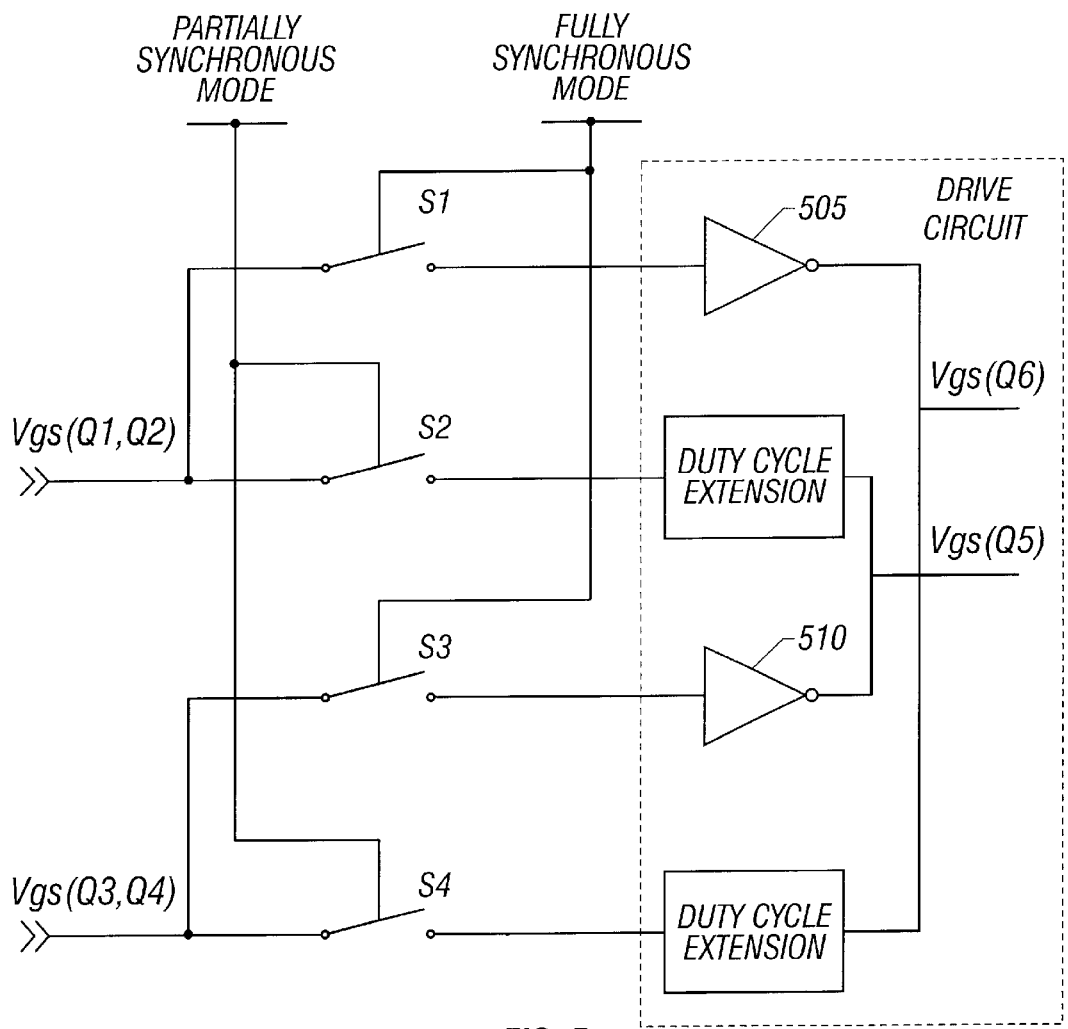
FIG. 5 is a block diagram of an implementation of the control scheme of the present invention for a double-ended topology, or a full bridge converter.

Referring now to FIG. 5, a block diagram of an implementation of the control scheme described above for a double-ended topology is illustrated. The dotted line in FIG. 5 represents the synchronous rectifier controller. The control algorithm is easily implemented by using analog switches S1, S2, S3, and 54. In the fully-synchronous mode, switches S1 and S3 are selected, Vgs(Q1,Q2) feeds to inverter 505 to drive synchronous rectifier Q6 and Vgs(Q3,Q4) feeds to inverter 505 to drive synchronous rectifier Q5. In the partially-synchronous mode, switches S2 and S4 are selected, and the signals Vgs (Q1,Q2) and Vgs(Q3,Q4) with a small time extension are used to drive the synchronous rectifiers Q5 and Q6, respectively.

Figure 3B:
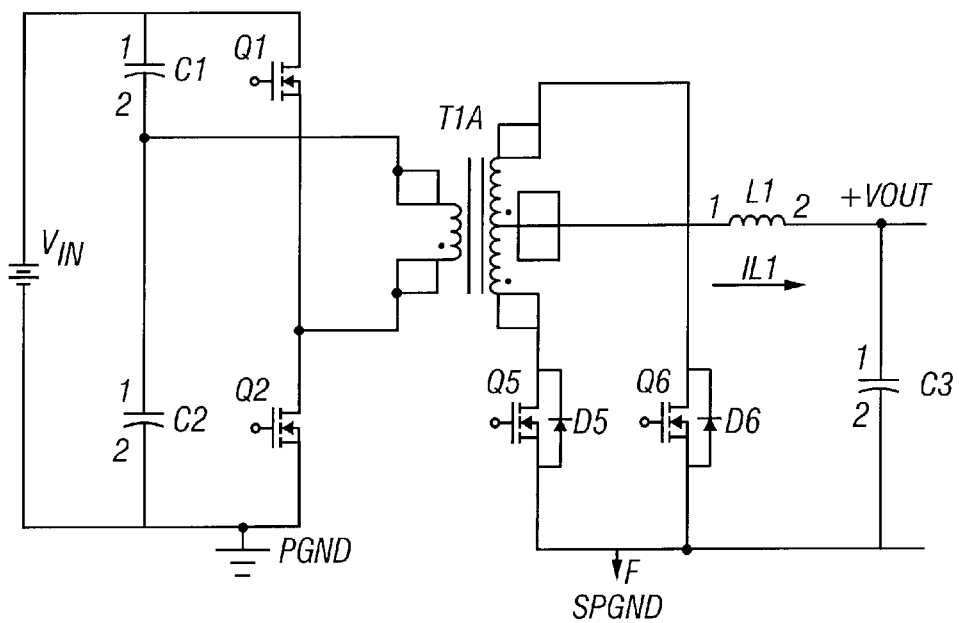
FIG. 3B is a schematic diagram of a half bridge DC to DC converter.
Figure 3C:
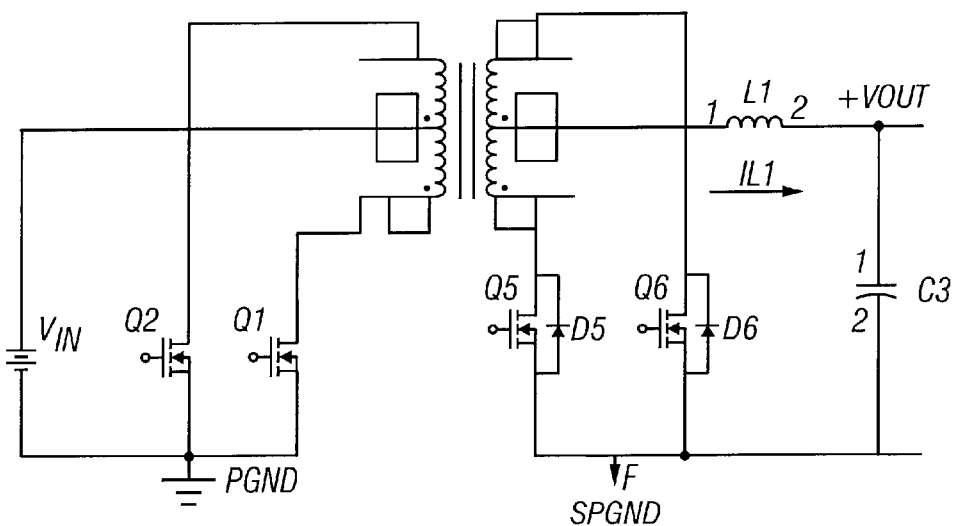
FIG. 3C is a schematic diagram of a push-pull DC to DC converter.

Although a full bridge topology is described above in reference to FIG. 3A, the present invention is not limited to such a topology, and can be easily applied to other topologies by one with skill in the art, such as the half bridge and push-pull topologies depicted in FIGS. 3B and 3C respectively. What follows are other embodiments of the control scheme of the present invention. One should recognize that the proposed control method can have numerous variations without departing from the scope and spirit of the present invention.

Figure 6:
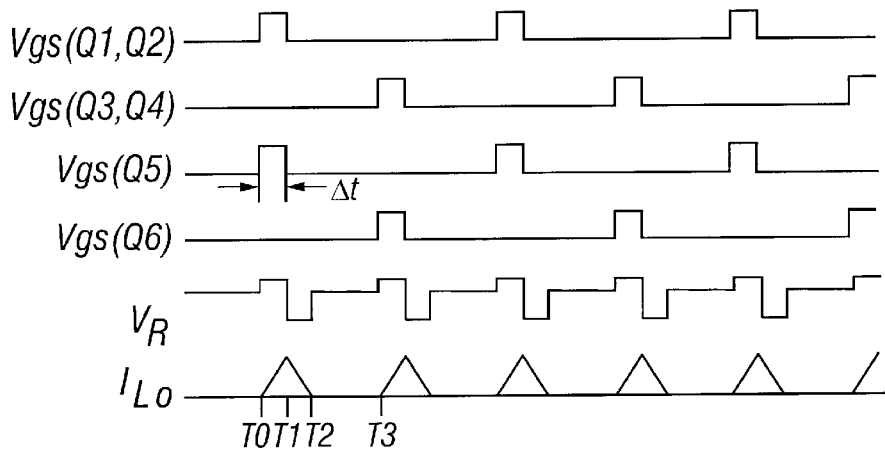
FIG. 6 is a timing diagram for the converter of FIG. 3 illustrating another embodiment of the control scheme of the present invention for the partially-synchronous mode.

Referring now to FIG. 6, a timing diagram for the circuit of FIG. 3A utilizing another embodiment of the control scheme of the present invention is illustrated. In this embodiment, the synchronous switches are governed by the following equation in the partially-synchronous mode:

$$Vgs(Q5)=\Delta t \text{ and } Vgs(Q6)=\Delta t \quad (5)$$

$$\text{where } 0<\Delta t \leq T1-T0 \quad (6)$$

Thus, when the primary power switches are on, one of the synchronous rectifier switches is also on, but the synchronous rectifier switch is turned off at or before the primary power switches are turned off. Compared with the control law given in Eqs. (3) and (4), the duty cycle for the synchronous rectifier switches is smaller. Again, the inductor current will never flow in the reverse direction, thus eliminating the possibility of bringing down the output bus voltage while also allowing the synchronous rectifiers to conduct for a limited time.

Figure 7:
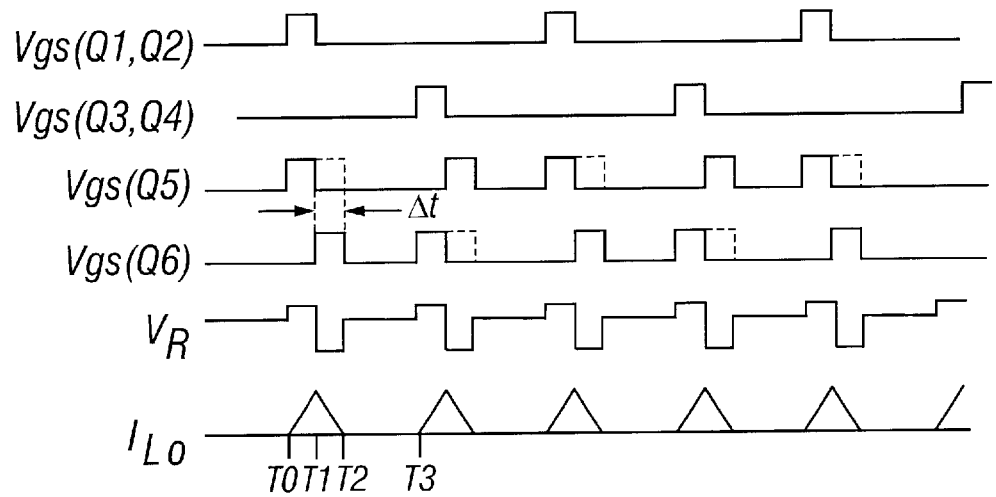
FIG. 7 is a timing diagram for the circuit of FIG. 3 illustrating another embodiment of the control scheme of the present invention for the partially-synchronous mode.

Referring now to FIG. 7, a timing diagram for the circuit of FIG. 3A utilizing another embodiment of the control scheme of the present invention is illustrated. In this embodiment, the partially-synchronous mode is implemented by turning on both of the synchronous rectifier switches Q5 and Q6 as illustrated by the dotted lines shown in FIG. 7 during the time Δt given in Eqs. (3) and (4). Thus, both synchronous rectifier switches are turned on to conduct freewheeling current during the time Δt (the interval from T1 to T2). This embodiment gives slightly higher efficiency compared with the embodiment of FIG. 4B which has only one synchronous rectifier switch operating during the freewheeling period. However, the control circuitry to implement the scheme of FIG. 7 is more complex than that required for FIG. 4B because two switches must be controlled rather than one.

Figure 8:
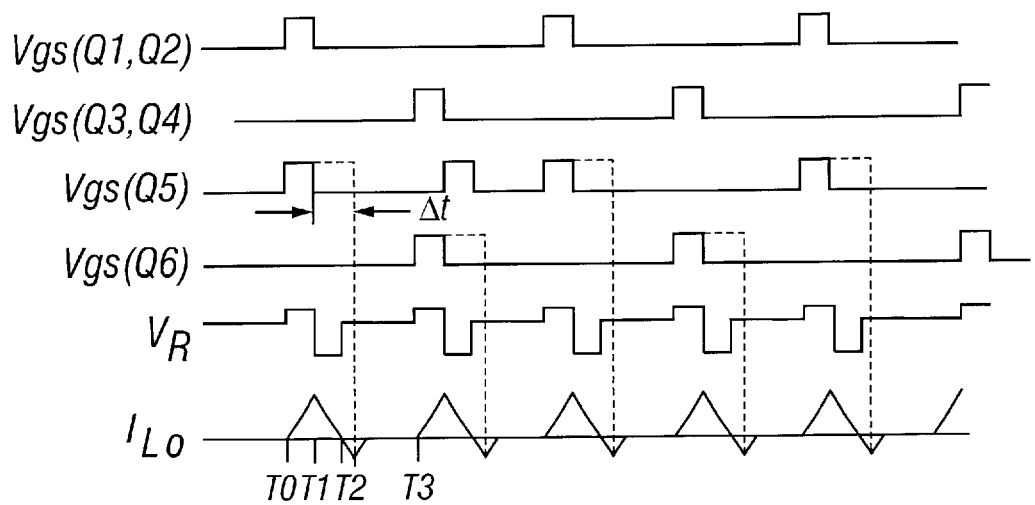
FIG. 8 is a timing diagram for the circuit of FIG. 3 illustrating another embodiment of the control scheme of the present invention for the partially-synchronous mode.

Referring now to FIG. 8, a timing diagram for the circuit of FIG. 3 utilizing another embodiment of the control scheme of the present invention is illustrated. Eq. 4 above requires that the synchronous rectifier extended on time Δt not exceed the time T2−T1 in order to prevent any reverse current flow through the synchronous rectifier. In other words, the synchronous rectifier switches should be turned off before the inductor current reaches zero. However, the embodiment of FIG. 8 shows an embodiment of the invention in which Δt>T2−T1. This result may be encountered in a circuit implementation of the control law of Eq. 4 because the timing could be off slightly and switches Q5 and Q6 may turn off slightly after the output inductor current reaches zero. Although turning off the switches Q5 and Q6 at the exact time the inductor current reaches zero is most desirable, it is not a departure from the present invention for the switches Q5 and Q6 to conduct after the inductor current reaches zero so long as the reverse current is not so substantial that it produces adverse results.

Extension of the above control scheme to other topologies such as single-ended isolated circuits or non-isolated circuits is straightforward. Different governing equations for the synchronous rectifier switches are established for each different topology although the guiding principles of the invention remain the same.

Figure 9:
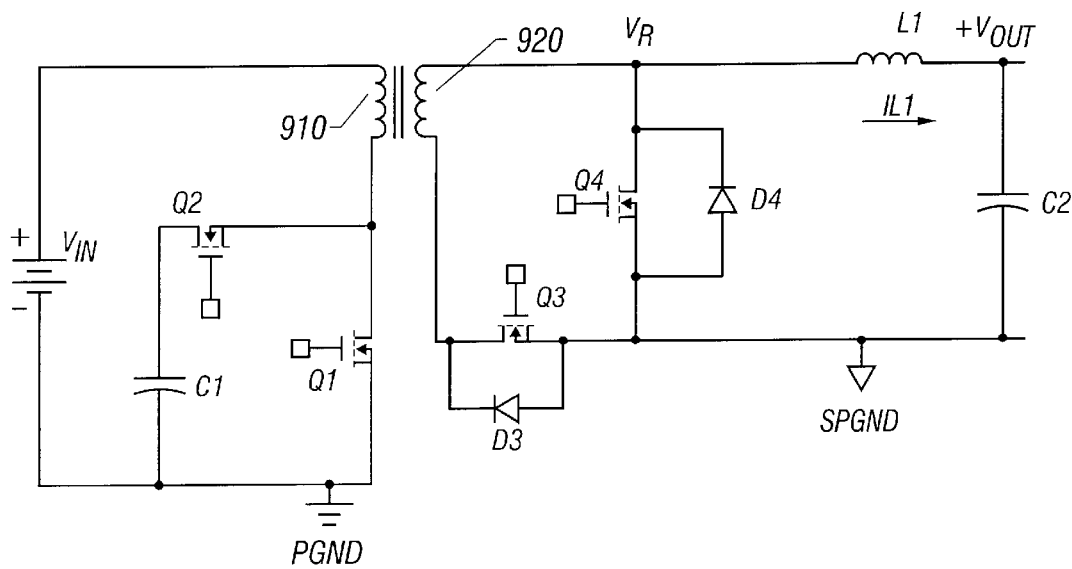
FIG. 9 is a schematic diagram of a single-ended clamped mode forward converter in which the present invention may be implemented.

Referring now to FIG. 9, a single-ended clamped mode forward converter in which the current invention may be implemented is illustrated. The forward converter circuit comprises a voltage input $V_{IN}$ connected to a primary winding 910 of a power transformer by power switches (e.g., MOSFET) Q1 and Q2. The secondary winding 920 of the power transformer is connected to synchronous rectifier switches Q3 and Q4.

For a forward DC to DC converter as shown in FIG. 9, the control law can be written as follows:

In fully-synchronous mode: $Vgs(Q3)=Vgs(Q1)$ and $Vgs(Q4)=\overline{Vgs(Q1)}$ (7)

In partially-synchronous mode: $Vgs(Q3)=Vgs(Q1)$ and $Vgs(Q4)=\Delta t$ (8)

where $0<\Delta t<T2-T1$ (9)

Figure 10:
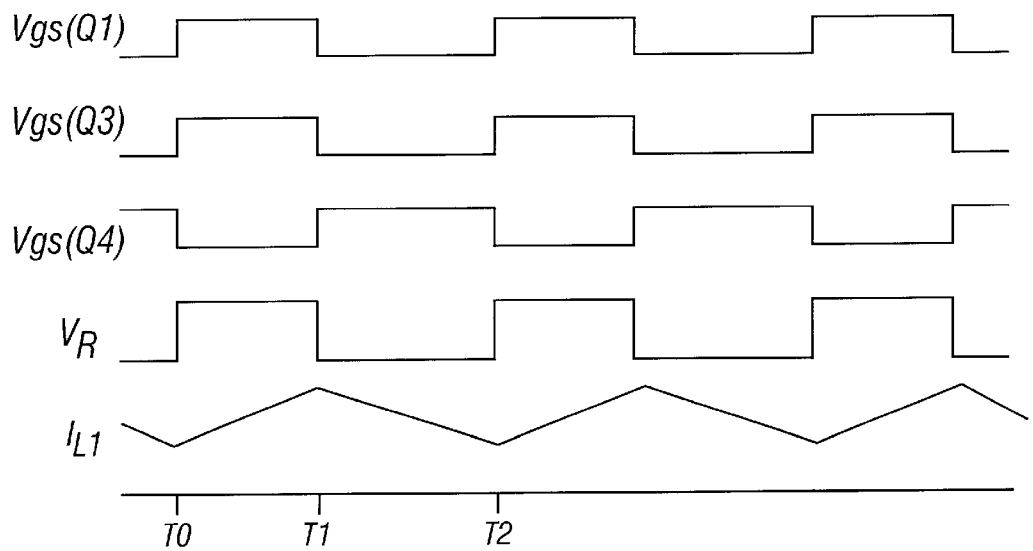
FIG. 10 is a timing diagram for the circuit of FIG. 9 in a fully-synchronous mode of operation.

Referring now to FIG. 10, a timing diagram for the circuit of FIG. 9 in the fully-synchronous mode of operation is illustrated. Note that this is typically a heavy-load condition.

Figure 11:
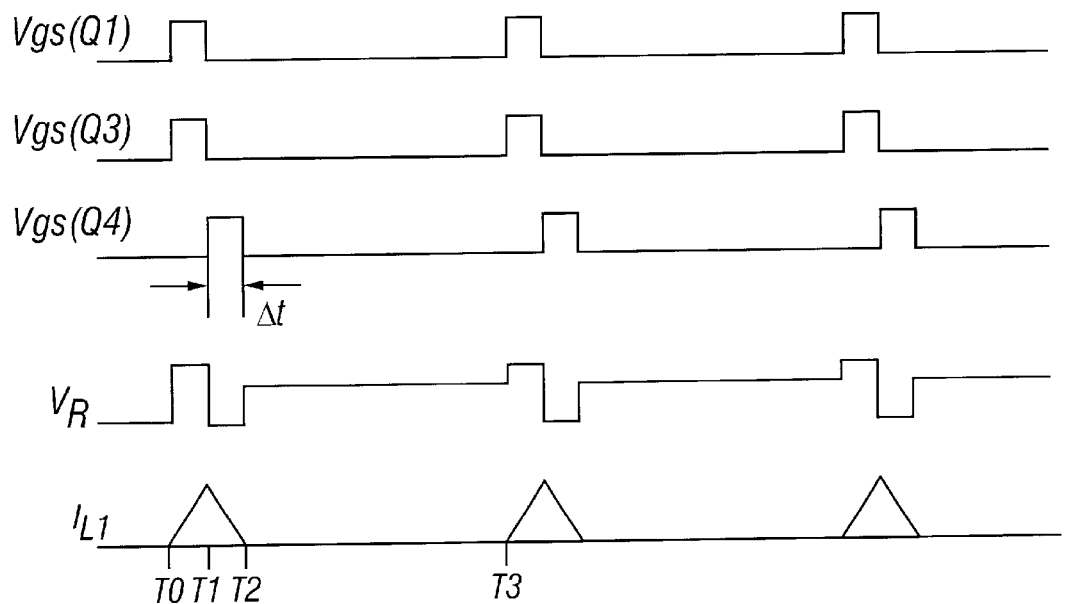
FIG. 11 is a timing diagram of the circuit of FIG. 9 in a partially-synchronous mode of operation.

Referring now to FIG. 11, a timing diagram for the circuit of FIG. 9 in the partially-synchronous mode of operation is illustrated. In the partially-synchronous mode of operation, reverse current flow is prevented in the circuit of FIG. 9 during startup or light-load conditions by turning off the synchronous rectifier switch Q4 before the inductor current reaches zero.

Figure 12:
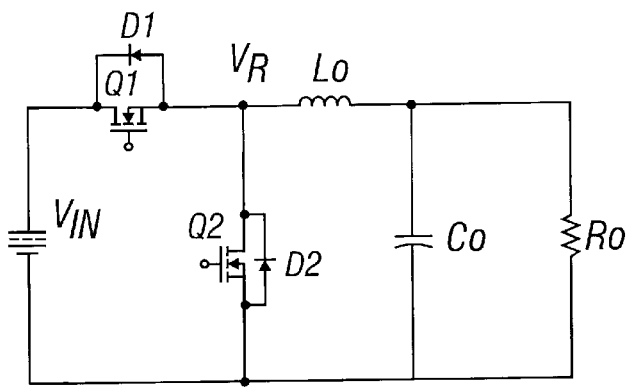
FIG. 12 is a schematic diagram of a buck converter in which the present invention may be implemented.

Referring now to FIG. 12, a buck converter in which the current invention may be implemented is illustrated. A similar control law is also applied to a buck converter:

In fully-synchronous mode: $Vgs(Q2)=\overline{Vgs(Q1)}$ (10)

In partially-synchronous mode: $Vgs(Q2)=\Delta t$ (11)

where $0<\Delta t<T2-T1$ (12)

Figure 13:
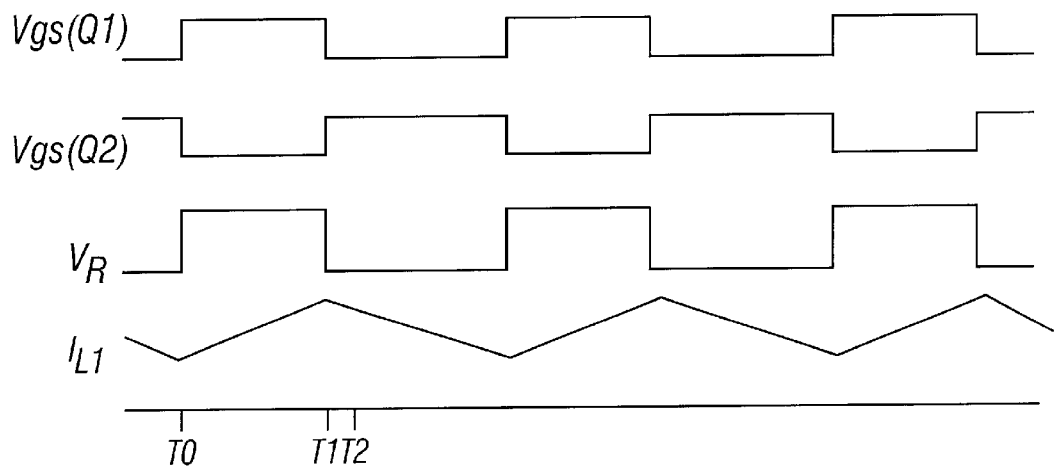
FIG. 13 is a timing diagram for the buck converter of FIG. 12 in the fully-synchronous mode of operation.

Referring now to FIG. 13, a timing diagram for the buck converter of FIG. 12 in the fully-synchronous mode of operation is illustrated. Note that this is a heavy-load condition.

Figure 14:
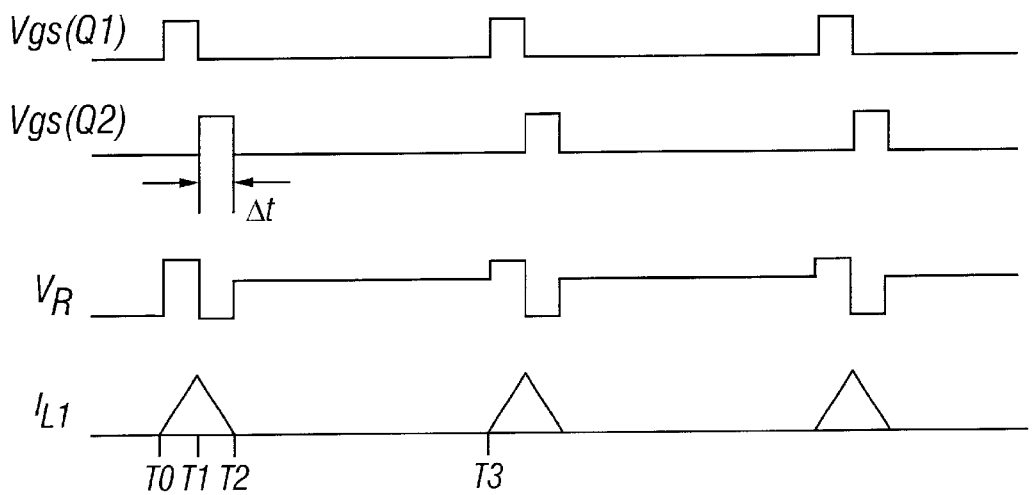
FIG. 14 is a timing diagram for the buck converter of FIG. 12 in the partially-synchronous mode of operation.

Referring now to FIG. 14, a timing diagram for the circuit of FIG. 12 in the partially-synchronous mode of operation is illustrated. In the partially-synchronous mode of operation, reverse current flow is prevented in the circuit of FIG. 12 during startup or light-load conditions by turning off the synchronous rectifier switch Q2 before the inductor current reaches zero at T2.

The Δt factor discussed above for double-ended isolated circuits (the full bridge converter), single-ended isolated circuits (the forward converter), and non-isolated circuits (the buck converter) can be implemented in different ways. It can be either a predetermined value or a variable, adapting to one of the circuit parameters, such as the input voltage or output voltage. This adaptive control of the $\Delta t$ factor takes full advantage of the control laws proposed above by turning off the synchronous switches at precisely the desired moment during all modes of operation.

Compared with the prior art, the invention offers several extra benefits in addition to preventing reverse current flow including the following:

1. Because the synchronous rectifiers are not disabled, when the circuit operates in startup or light-load conditions, high efficiency operation of the circuit is preserved.
2. The control algorithm is very simple and easy to implement. For a full-bridge DC to DC converter, for instance, the synchronous rectifier switches can be controlled to simply follow the primary power switches drive signals in the partially-synchronous mode.
3. Voltage overshoot/undershoot during the mode transition can be minimized by proper design of $\Delta t$.
4. The algorithm can be easily extended to various topologies, isolated or non-isolated, single ended or double ended.

Those skilled in the art should understand that the previously described embodiments of the synchronous rectifier control scheme are submitted for illustrative purposes only and other embodiments thereof are well within the scope and spirit of the present invention. Although the present invention has been described in detail, those skilled in the art should understand that they can make various changes, substitutions and alterations herein without departing from the spirit and scope of the invention in its broadest form.

What is claimed is:

1. A control circuit for use with a power converter having a synchronous rectifier circuit for producing substantially direct current, said control system comprising:
    a sensor for sensing a characteristic of said power converter;
    detection circuitry capable of using said characteristic to develop a control signal for controlling said power converter; and
    synchronous rectifier control circuitry connected to said detection circuitry wherein said control circuitry is adapted to modify a duty cycle of said synchronous rectifier circuit as a function of said control signal to thereby limit an amount of reverse current that is allowed to flow through said power converter to a predetermined level, wherein the duty cycle is maintained greater than zero by the control circuitry.

2. The control circuit of claim 1 wherein said predetermined level is such that said reverse current flow does not degrade said power converter performance.

3. The control circuit of claim 1 wherein said duty cycle is maintained greater than zero by said control circuitry.

4. The control circuit of claim 1 wherein a forward current flow is allowed to flow through said synchronous rectifier during all modes of operation such that an intrinsic body diode is not overstressed.

5. The control circuit of claim 1 wherein said characteristic is an average current flow from said converter and wherein said detection circuitry compares said average current flow to a reference value to determine whether said current is above or below said predetermined level.

6. The control circuit of claim 1 wherein said synchronous rectifier control circuitry continues to drive said synchronous rectifier during startup, shutdown, light-load, and normal operating modes.

7. The control circuit of claim 1 wherein said power converter is connected in parallel with a second power converter such that a reverse current flow caused by said second power converter is limited to said predetermined level.

8. The control circuit of claim 1 wherein said power converter further comprises a power transformer having a primary winding and a secondary winding wherein said secondary winding is coupled to said synchronous rectifier circuit and wherein said primary winding is connected to a power switch for periodically connecting said primary winding to a source of electrical energy.

9. The control circuit of claim 1 wherein said power converter has a topology chosen from the group consisting of a buck converter, a single-ended isolated converter, a double-ended isolated converter, a full bridge converter, a half-bridge converter, and a push-pull converter.

10. A power system having at least one converter with at least one synchronous rectifier adapted to rectify substantially alternating current to produce substantially direct current, said power system comprising:
    a synchronous rectifier drive circuit for driving said at least one synchronous rectifier for a duty cycle;
    synchronous rectifier control circuitry connected to said synchronous rectifier drive circuit wherein said control circuitry is adapted to modify said duty cycle of said synchronous rectifier circuit as a function of an output current level from said converter such that a reverse current flow through said converter is limited to a predetermined level, wherein the duty cycle is maintained greater than zero by the control circuitry.

11. The power system of claim 10 wherein said predetermined level is such that said reverse current flow does not degrade said converter performance.

12. The power system of claim 10 wherein said duty cycle is maintained greater than zero by said control circuitry.

13. The power system of claim 10 wherein a forward current flow is allowed to flow through said synchronous rectifier during all modes of operation such that an intrinsic body diode is not overstressed.

14. The power system of claim 10 wherein said synchronous rectifier control circuitry continues to drive said at least one synchronous rectifier during startup, shutdown, light-load, and normal operating modes.

15. The power system of claim 10 wherein said at least one converter is connected in parallel with a second converter such that a reverse current flow caused by said second converter is limited to said predetermined level.

16. The power system of claim 10 wherein said at least one converter further comprises a power transformer having a primary winding and a secondary winding wherein said secondary winding is coupled to said at least one synchronous rectifier and wherein said primary winding is connected to a power switch for periodically connecting said primary winding to a source of electrical energy.

17. A method for controlling a synchronous rectifier in a power converter, said method comprising the following steps:
    (a) sensing a characteristic of said power converter;
    (b) determining an output current level for said power converter based on said characteristic sensed; and
    (c) responsive to a determination that said current level is below a pre-determined level, modifying a duty cycle of said synchronous rectifier such that said current level is maintained above an acceptable level, wherein the duty cycle is maintained greater than zero by the control circuitry.

18. The method of claim 17 wherein said step of sensing comprises sensing an average output current level from said power converter.

19. The method of claim 17 wherein said step of modifying a duty cycle comprises turning on said synchronous rectifier to conduct forward current and turning off said synchronous rectifier before said reverse current level reaches a pre-determined level.

20. The method of claim 17 wherein said power converter is operated in a partially-synchronous mode of operation when said output current level is below said pre-determined level and in a fully-synchronous mode of operation when said output current level is equal to or greater than said predetermined level.

* * * * *

UNITED STATES PATENT AND TRADEMARK OFFICE
CERTIFICATE OF CORRECTION

PATENT NO. : 6,618,274 B2
DATED : September 9, 2003
INVENTOR(S) : Jeffrey John Boylan et al.

It is certified that error appears in the above-identified patent and that said Letters Patent is hereby corrected as shown below:

Title page, Item [54] and Column 1, line 1,
Title, please delete "CONTROLLER" after "RECTIFIER" and insert -- CONTROL SCHEME --.

Column 5,
Lines 6-12, please delete whole paragraph, "The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:"

Signed and Sealed this

Thirtieth Day of December, 2003

JAMES E. ROGAN
*Director of the United States Patent and Trademark Office*